(No Model.)
C. F. HARRINGTON.
HUB ATTACHING DEVICE.
No. 353,218. Patented Nov. 23, 1886.
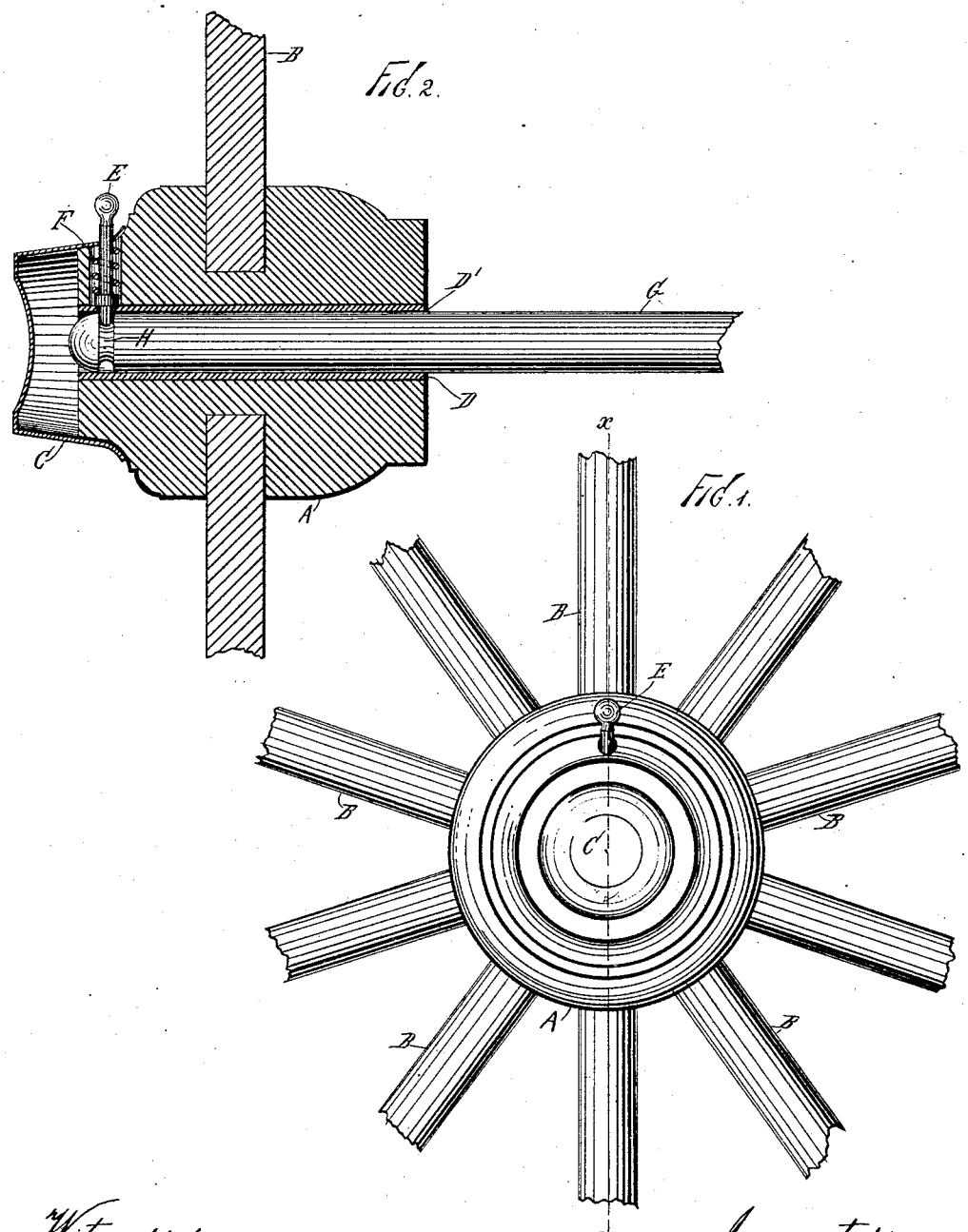

United States Patent Office.

CHARLES F. HARRINGTON, OF LYNDHURST, NEW JERSEY.

HUB-ATTACHING DEVICE.

SPECIFICATION forming part of Letters Patent No. 353,218, dated November 23, 1886.

Application filed July 24, 1885. Serial No. 172,499. (No model.)

*To all whom it may concern:*

Be it known that I, CHARLES F. HARRINGTON, a citizen of the United States, and a resident of Lyndhurst, in the county of Bergen and State of New Jersey, have invented certain new and useful Improvements in Carriage Wheels and Axles, of which the following is a specification.

My invention relates especially to the construction and arrangement of vehicle wheels and axles, particularly for baby-carriages, and has for its object the provision of cheap, simple, and effective means whereby the wheel may be removably secured upon the axle, dispensing with the usual screw-threads and nuts, and with the shoulder on the axle against which the wheel-hub bears.

To attain the desired end, my invention consists, essentially, in the combination, with the wheel-hub, of a catch or bolt adapted and arranged to engage with a circumferential groove or channel in the axle, holding the wheel in its proper position, permitting free revolution thereof, while preventing lateral movement or play upon the axle, all of which will be hereinafter first fully described, and then pointed out in the claim.

In the drawings, Figure 1 is a front elevation of a hub and portion of a wheel made in accordance with my invention, and Fig. 2 is a vertical sectional view at line $x\ x$ of Fig. 1.

Like letters of reference, wherever they occur, indicate corresponding parts in both figures.

A is the wheel hub, and B are the spokes. C is the usual cap, fitting over the outer extremity of the hub.

D is a metal thimble or box lining the central perforation, D', through the hub, and forming the bearing for the axle.

E is a catch or bolt extending from the outside of the hub into the central perforation, D', as plainly shown in Fig. 2. This bolt or catch is held in position by a spring, F.

G is the axle, preferably made of round metal, and provided near each extremity with a circumferential groove or channel, H, into which the bolt or catch E extends.

When constructed and arranged in accordance with the foregoing description, my improved device will be found admirably adapted to the uses and purposes for which it is intended. The necessity of cutting at each extremity of the axle is obviated, and the usual nuts thereon are dispensed with. The wheel may be instantly removed for transportation, oiling, &c., by simply raising the catch from engagement with the axle, and in replacing the wheel the catch acts automatically, securing the wheel in place. No shoulder or bearings for the inner ends of the wheel-hubs are required, and there are no removable parts of the securing mechanism to be lost or misplaced.

I am aware that hub-fastenings have been made wherein a catch or catch-plate engaged in an annular groove in the axle; but they either did not engage automatically in the groove or a wire or its equivalent was employed in order to release the catch or catches for removing the wheel. To such constructions I make no claim; but,

Having now fully described my invention, what I claim as new therein, and desire to secure by Letters Patent, is—

The combination, with the axle G, having the groove H formed therein, of the hub A, provided with a radial bolt, E, extending into said groove; a spiral spring encircling the bolt within the body of the hub, substantially as shown and described.

Signed at New York, in the county of New York and State of New York, this 22d day of July, A. D. 1885.

CHARLES F. HARRINGTON.

Witnesses:
 A. M. PIERCE,
 LYNDON P. SMITH.